United States Patent
Yang et al.

(10) Patent No.: US 8,934,056 B2
(45) Date of Patent: Jan. 13, 2015

(54) AUDIO-VIDEO SYNCHRONIZATION DETECTION DEVICE AND METHOD THEREOF

(71) Applicant: Wistron Corporation, New Taipei (TW)

(72) Inventors: Ping-Han Yang, New Taipei (TW); Meng-Hsian Shih, New Taipei (TW); Yi-Tsuen Hu, New Taipei (TW); Yung-Tien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/078,485

(22) Filed: Nov. 12, 2013

(65) Prior Publication Data

US 2014/0307107 A1    Oct. 16, 2014

(30) Foreign Application Priority Data

Apr. 10, 2013 (TW) .............................. 102112715 A

(51) Int. Cl.
- *H04N 9/475* (2006.01)
- *H04N 17/00* (2006.01)
- *H04N 5/04* (2006.01)

(52) U.S. Cl.
CPC . *H04N 17/00* (2013.01); *H04N 5/04* (2013.01)
USPC .......................................................... 348/512

(58) Field of Classification Search
USPC ............ 348/512, 500, 513–521, 194; 714/35, 714/38.14
See application file for complete search history.

(56) References Cited

U.S. PATENT DOCUMENTS

| | | | |
|---|---|---|---|
| 7,636,126 B2* | 12/2009 | Mallinson | 348/515 |
| 7,692,724 B2* | 4/2010 | Arora et al. | 348/515 |
| 7,920,209 B2* | 4/2011 | Mallinson | 348/515 |
| 8,525,885 B2* | 9/2013 | Steinberg et al. | 348/191 |
| 8,643,770 B2* | 2/2014 | Cote et al. | 348/371 |
| 8,665,320 B2* | 3/2014 | Holley | 348/53 |
| 8,683,269 B2* | 3/2014 | Jackson | 714/38.14 |
| 2006/0139490 A1* | 6/2006 | Fekkes et al. | 348/515 |
| 2007/0164776 A1 | 7/2007 | Chang et al. | |
| 2007/0176871 A1 | 8/2007 | Tsai et al. | |
| 2008/0260350 A1* | 10/2008 | Cooper | 386/84 |
| 2010/0124403 A1* | 5/2010 | Thornburg | 386/66 |

(Continued)

FOREIGN PATENT DOCUMENTS

| | | |
|---|---|---|
| CN | 100546391 | 9/2009 |
| CN | 101742357 | 6/2010 |

(Continued)

*Primary Examiner* — Paulos M Natnael
(74) *Attorney, Agent, or Firm* — Jianq Chyun IP Office

(57) ABSTRACT

An audio-video synchronization detection device and a method thereof are provided. The audio-video synchronization detection device detects an object under test which is capable of generating an image signal and an audio signal. The audio-video synchronization detection device includes a delay circuit, an optical sensor, and a signal processor. The delay circuit delays the audio signal for a predetermined time and generates an audio correction signal accordingly. The optical sensor senses a light emitted by a display panel when the display panel displays the image signal and generates an image sensing signal accordingly. The signal processor calculates a delay time between the audio correction signal and the image sensing signal to obtain a synchronization state between the image signal and the audio signal.

10 Claims, 3 Drawing Sheets

(56) References Cited

U.S. PATENT DOCUMENTS

2011/0013085 A1* 1/2011 Kulyk ............................ 348/520
2012/0266024 A1* 10/2012 Jackson ........................... 714/35

FOREIGN PATENT DOCUMENTS

TW    I321218    3/2010
TW    I344558    7/2011

* cited by examiner

AUDIO-VIDEO SYNCHRONIZATION DETECTION DEVICE AND METHOD THEREOF

CROSS-REFERENCE TO RELATED APPLICATION

This application claims the priority benefit of Taiwan application serial no. 102112715, filed on Apr. 10, 2013. The entirety of the above-mentioned patent application is hereby incorporated by reference herein and made a part of this specification.

BACKGROUND OF THE INVENTION

1. Field of the Invention

The present invention generally relates to a detection device and a method thereof, and more particularly, to an audio-video synchronization detection device and a method thereof.

2. Description of Related Art

An audio-video processing unit is usually built in a multimedia audio-video device, such as a display or a blue-ray player, for converting an image data stream and an audio data stream into an image signal and an audio signal. In addition, before a multimedia audio-video device is shipped, the synchronization state between the image signal and the audio signal output by the audio-video processing unit is detected through an audio-video synchronization detection device regardless of the type of the multimedia audio-video device, so as to ensure that synchronous audio and video can be received by a consumer.

A conventional audio-video synchronization detection device directly measures the difference between the image signal and the audio signal output by the audio-video processing unit and determines the synchronization state between the image signal and the audio signal accordingly. However, in a real application, the image signal and audio signal in the multimedia audio-video device are respectively played by a display panel and a speaker in the application system. Thus, the audio and video received by the consumer respectively come from the display panel and the speaker rather than the audio-video processing unit. Additionally, it may result in signal delays in the process of transmitting the image signal and the audio signal from the audio-video processing unit to the display panel and the speaker and in processing the signals by the display panel and the speaker. As a result, asynchronous audio and video may be received by the consumer.

In other words, the conventional audio-video synchronization detection device ignores the delay errors produced during the transmission of the image signal and the audio signal, which causes the detection result to be different from the actual experience of a consumer. Namely, the conventional audio-video synchronization detection device cannot properly detect the audio-video synchronization quality of the multimedia audio-video device.

SUMMARY OF THE INVENTION

Accordingly, the present invention is directed to an audio-video synchronization detection device and a method thereof, in which the audio-video synchronization quality of an object under test is detected by simulating delay errors in the process of transmitting an audio signal and an image signal, so that the detection result can be close to the actual experience of a consumer.

The present invention provides an audio-video synchronization detection device for detecting an object under test. The object under test is capable of generating an image signal and an audio signal, and the audio-video synchronization detection device is electrically connected to the object under test to receive the image signal and the audio signal. The audio-video synchronization detection device includes a delay circuit, an optical sensor, and a signal processor. The delay circuit delays the audio signal for a predetermined time and generates an audio correction signal accordingly. The optical sensor senses a light emitted by a display panel when the display panel displays the image signal and generates an image sensing signal accordingly. The signal processor calculates a delay time between the audio correction signal and the image sensing signal to obtain a synchronization state between the image signal and the audio signal.

According to an embodiment of the present invention, the display panel is disposed in the audio-video synchronization detection device, and the object under test includes an audio-video processing unit, wherein the audio-video processing unit converts an image data stream into the image signal and converts an audio data stream into the audio signal.

According to an embodiment of the present invention, the display panel is disposed in the object under test, and the object under test further includes an audio-video processing unit, wherein the audio-video processing unit converts an image data stream into the image signal and converts an audio data stream into the audio signal.

The present invention provides an audio-video synchronization detection method for detecting an object under test. The object under test is capable of generating an image signal and an audio signal. The audio-video synchronization detection method includes following steps. The object under test is connected, and the image signal and the audio signal are received. The audio signal is delayed for a predetermined time, and an audio correction signal is generated accordingly. A light emitted by a display panel when the display panel displays the image signal is sensed by an optical sensor to obtain an image sensing signal. A delay time between the audio correction signal and the image sensing signal is calculated to obtain a synchronization state between the image signal and the audio signal.

As described above, the present invention utilizes the delay time to simulate the delay error in the process of transmitting the audio signal, and senses an optical signal from the display panel to simulate the delay error in the process of transmitting the image signal. Accordingly, the detected delay time is close to the actual experience of a consumer. Thereby, an audio-video synchronization detection device provided by the present invention can properly detect the audio-video synchronization quality of an object under test and ensure that the audio-video service provided by the object under test can bring visual and auditory enjoyments to the consumer.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
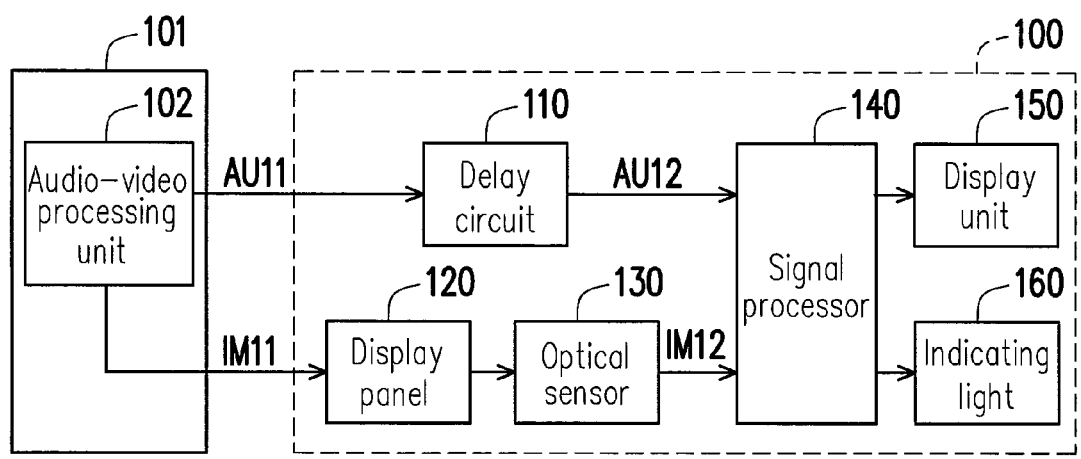
FIG. 1 is a block diagram of an audio-video synchronization detection device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an audio-video synchronization detection device according to an embodiment of the present invention. Referring to FIG. 1, the audio-video synchronization detection device 100 is used to detect an object under test 101. The object under test 101 includes an audio-video processing unit 102. The audio-video processing unit 102 is suitable for receiving an image data stream and an audio data stream. Besides, the audio-video processing unit 102 respectively processes (for example, decodes) the image data stream and the audio data stream to convert the image data stream into an image signal IM11 and convert the audio data stream into an audio signal AU11. It should be mentioned that the audio-video processing unit 102 in the present embodiment may be an integrated chip/circuit which is capable of processing both audio and image data, or the audio-video processing unit 102 may also include a chip/circuit for processing image data and a chip/circuit for processing audio data.

In other words, the object under test 101 detected by the audio-video synchronization detection device 100 is capable of generating the image signal IM11 and the audio signal AU11. In a real application, the object under test 101 may be a multimedia audio-video device, such as a blue-ray player. Besides, the audio-video synchronization detection device 100 is used for detecting the audio-video synchronization quality of the object under test 101, so as to ensure the comfort of a consumer while watching videos.

Figure 2:
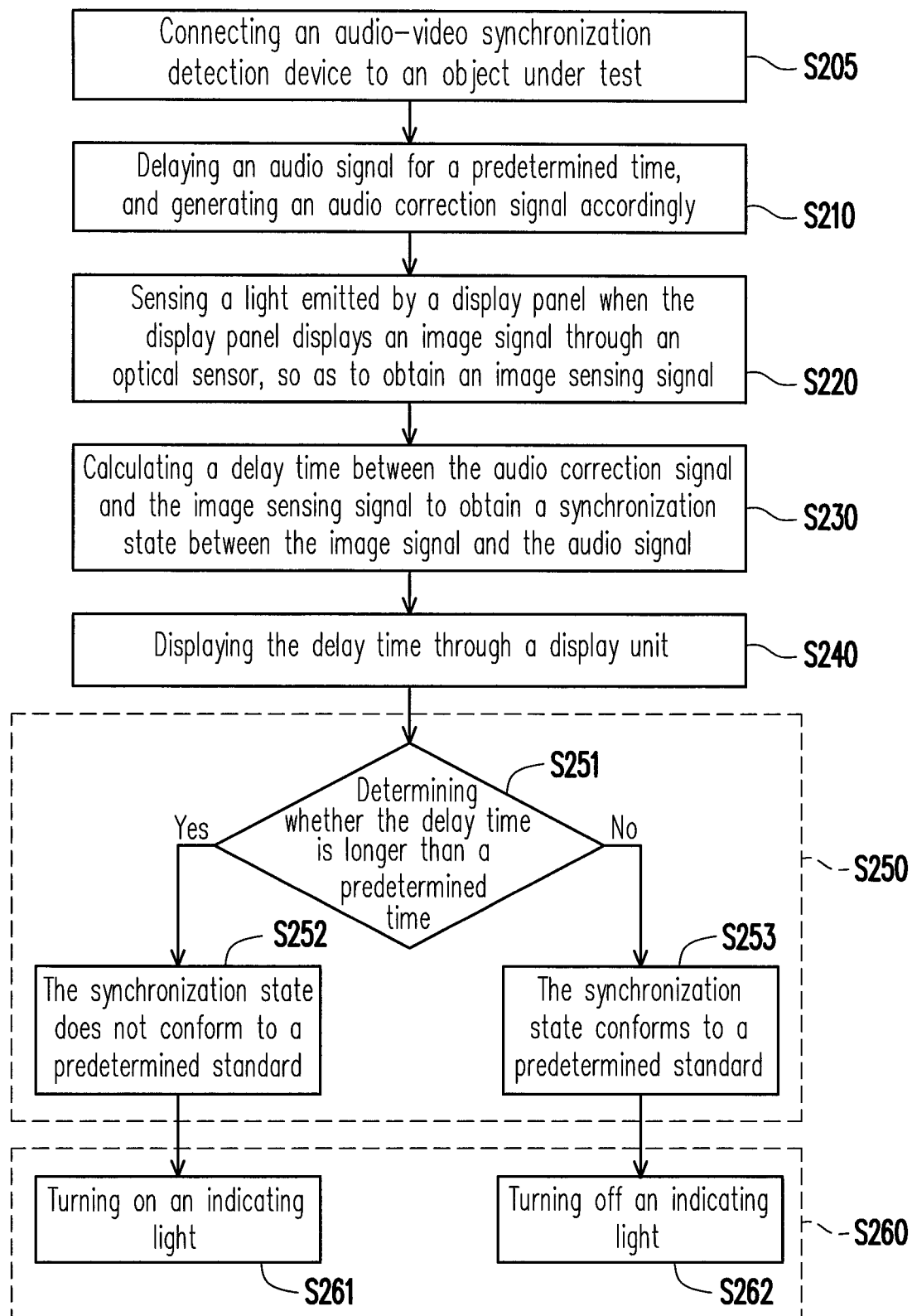
FIG. 2 is a flowchart of an audio-video synchronization detection method according to an embodiment of the present invention.

To be specific, the audio-video synchronization detection device 100 includes a delay circuit 110, a display panel 120, an optical sensor 130, and a signal processor 140. FIG. 2 is a flowchart of an audio-video synchronization detection method according to an embodiment of the present invention. Below, the operation of the audio-video synchronization detection device 100 will be described with reference to both FIG. 1 and FIG. 2.

First, in step S205, the audio-video synchronization detection device 100 is connected to an audio output interface of the object under test 101 through an audio signal line to receive the audio signal AU11, and the audio-video synchronization detection device 100 is connected to an image output interface of the object under test 101 through an image signal line to receive the image signal IM11. If the object under test 101 does not have the audio output interface, the audio signal line is connected to a circuit, which is capable of outputting the audio output signal to a speaker, in the object under test 101.

In step S210, the delay circuit 110 delays the audio signal AU11 for a predetermined time and generates an audio correction signal AU12 accordingly. The delay circuit 110 is used to simulate the delay error in the process of transmitting the audio signal AU11 to human ears. For example, in a real application, the audio signal AU11 from the object under test 101 is played by a speaker in the application system, and accordingly a consumer hears the corresponding sound. In addition, it may result in signal delays in the process of transmitting the audio signal AU11 to the speaker and processing the audio signal AU11 by the speaker. Thus, in order to simulate the signal delays, the audio-video synchronization detection device 100 delays the audio signal AU11 through the delay circuit 110. To be specific, the delay circuit 110 can simulate a condition of a dummy load of the speaker.

It should be noted that different object under test 101 is corresponding to different delay error. Thus, the delay circuit 110 adjusts its internal predetermined time according to a control signal. The control signal is provided by the signal processor 140 or is an external signal of the audio-video synchronization detection device 100. Accordingly, the delay circuit 110 can delay the audio signal AU11 from different object under test 101 by using different predetermined time, so as to simulate the condition of the dummy load of the speaker. Moreover, in other embodiments, the delay error corresponding to the object under test 101 can be ignored. In this case, the predetermined time in the delay circuit 110 can be adjusted to zero through aforementioned control signal. Namely, in other embodiments, the delay circuit 110 can directly output the audio signal AU11 as the audio correction signal AU12 according to the control signal.

On the other hand, in step S220, the display panel 120 displays the image signal IM11. Besides, the optical sensor 130 senses a light emitted by the display panel 120 when the display panel 120 displays the image signal IM11, and the optical sensor 130 generates an image sensing signal IM12 accordingly. It should be noted that in a real application, the image signal IM11 of the object under test 101 is played through a specific display in the application system, so that a consumer can see the corresponding image. Accordingly, in order to simulate the time point at which the consumer receives the image, the audio-video synchronization detection device 100 senses the light emitted by a display panel through the optical sensor 130. The optical sensor 130 may be a photodiode, a photoresistor, a photoconductor, or a phototransistor.

Next, in step S230, the signal processor 140 calculates a delay time between the audio correction signal AU12 and the image sensing signal IM12 to obtain a synchronization state between the audio signal AU11 and the image signal IM11. In other words, the audio-video synchronization detection device 100 simulates the delay error in process of transmitting the audio signal AU11 to human ears by the delay circuit 110 and simulates the delay error in process of transmitting the image signal IM11 to human eyes by sensing an optical signal from the display panel 120. Thus, the delay time detected by the audio-video synchronization detection device 100 is close to the actual experience of the consumer. In other words, the audio-video synchronization detection device 100 can properly detect the audio-video synchronization quality of the object under test 101 and ensure that the audio-video service provided by the object under test 101 can bring visual and auditory enjoyments to the consumer.

In order to allow a tester to see the detection result instantly, in an embodiment, the audio-video synchronization detection device 100 further includes a display unit 150. In addition, in step S240, the display unit 150 displays the delay time calculated by the signal processor 140.

Additionally, in step S250 of another embodiment, the signal processor 140 further determines whether the synchronization state between the image signal IM11 and the audio signal AU11 conforms to a predetermined standard according to the delay time. For example, in step S251, the signal processor 140 determines whether the delay time is longer than a predetermined time. When the delay time is longer than the predetermined time, the signal processor 140 determines that the synchronization state does not conform to the predetermined standard. Contrarily, when the delay time is not longer than the predetermined time, the signal processor 140 determines that the synchronization state conforms to the predetermined standard.

In yet another embodiment, the audio-video synchronization detection device 100 displays the determination result of the signal processor 140 through at least one indicating light. For example, in another embodiment, the audio-video synchronization detection device 100 further includes an indicating light 160, wherein the indicating light 160 may be a light emitting diode (LED). Besides, in step S260, the signal processor 140 controls the on/off state of the indicating light 160 according to the synchronization state between the image signal IM11 and the audio signal AU11. For example, when the synchronization state does not conform to the predetermined standard, the signal processor 140 turns on the indicating light 160. Otherwise, when the synchronization state conforms to the predetermined standard, the signal processor 140 turns off the indicating light 160. Accordingly, a tester can get to know the determination result of the signal processor 140 based on the on/off state of the indicating light 160. In yet another embodiment, the indicating function of the indicating light 160 can be integrated into the display unit 150. Namely, a notification message indicating whether the synchronization state conforms to the predetermined standard or not is displayed by a user interface of the display unit 150.

It should be mentioned that the object under test 101 (i.e., a multimedia audio-video device) illustrated in FIG. 1 may further include a display panel, such as a TV. Thus, in another embodiment, those having ordinary skill in the art may also remove the display panel 120 in the audio-video synchronization detection device 100 illustrated in FIG. 1 according to the design requirement.

Figure 3:
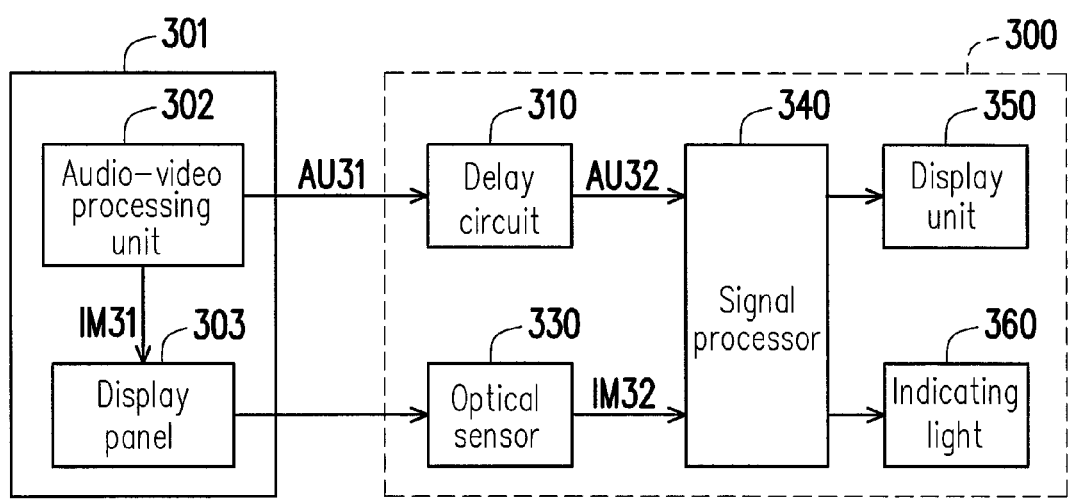
FIG. 3 is a block diagram of an audio-video synchronization detection device according to another embodiment of the present invention.

FIG. 3 is a block diagram of an audio-video synchronization detection device according to another embodiment of the present invention. The audio-video synchronization detection device 300 in the embodiment illustrated in FIG. 3 has a structure similar to that of the audio-video synchronization detection device 100 in the embodiment illustrated in FIG. 1. The difference between the present embodiment and the embodiment illustrated in FIG. 1 is that no display panel is disposed in the audio-video synchronization detection device 300. Namely, the audio-video synchronization detection device 300 includes a delay circuit 310, an optical sensor 330, a signal processor 340, a display unit 350, and an indicating light 360.

Additionally, the audio-video synchronization detection device 300 detects an object under test 301, wherein the object under test 301 includes an audio-video processing unit 302 and a display panel 303. The audio-video processing unit 302 converts an image data stream into an image signal IM31 and converts an audio data stream into an audio signal AU31. The display panel 303 in the object under test 301 displays the image signal IM31.

On the other hand, similar to that in the embodiment illustrated in FIG. 1, the operation of the audio-video synchronization detection device 300 can be illustrated by the audio-video synchronization detection method illustrated in FIG. 2. For example, in step S210, the delay circuit 310 delays an audio signal AU31 for a predetermined time and generates an audio correction signal AU32 accordingly. In step S220, the optical sensor 330 senses a light emitted by the display panel 303 when the display panel 303 displays the image signal IM31 and generates an image sensing signal IM32 accordingly. In step S230, the signal processor 340 calculates a delay time between the audio correction signal AU32 and the image sensing signal IM32 to obtain the synchronization state between the audio signal AU31 and the image signal IM31.

To be specific, in step S240, the audio-video synchronization detection device 300 displays the delay time through the display unit 350 so that a tester can get to know the detection result instantly. In step S250, the signal processor 340 further determines whether the synchronization state between the image signal IM31 and the audio signal AU31 conforms to a predetermined standard according to the delay time. In step S260, the audio-video synchronization detection device 300 further displays the determination result of the signal processor 340 through the indicating light 360 or the display unit 350. The operation details of various components of the audio-video synchronization detection device 300 in the embodiment illustrated in FIG. 3 have been described in foregoing embodiments therefore will not be described herein.

As described above, the embodiment of the present invention utilizes the delay time to simulate the delay error in the process of transmitting the audio signal, and senses the optical signal from the display panel to simulate the delay error in the process of transmitting the image signal. Thus, the detected delay time is close to the actual experience of a consumer. Thereby, an audio-video synchronization detection device provided by the present invention can properly detect the audio-video synchronization quality of an object under test and ensure that the audio-video service provided by the object under test can bring visual and auditory enjoyments to the consumer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An audio-video synchronization detection device, for detecting an object under test, wherein the object under test is capable of generating an image signal and an audio signal, and the audio-video synchronization detection device is electrically connected to the object under test to receive the image signal and the audio signal, the audio-video synchronization detection device comprising:

a delay circuit, adapted to delay the audio signal for a predetermined time, and adapted to generate an audio correction signal accordingly, wherein the predetermined time is used to simulate a delay error in a process of transmitting the audio signal to human ears;

an optical sensor, adapted to sense a light emitted by a display panel when the display panel displays the image signal, and adapted to generate an image sensing signal accordingly; and a signal processor, adapted to calculate a delay time between the audio correction signal and the image sensing signal to obtain a synchronization state between the image signal and the audio signal, wherein the signal processor determines whether the delay time is longer than a predetermined time, when the delay time is longer than the predetermined time, the signal processor deteii lines that the synchronization state between the image signal and the audio signal does not conform to a predetermined standard, and when the delay time is not longer than the predetermined time, the signal processor determines that the synchronization state between the image signal and the audio signal conforms to the predetermined standard.

2. The audio-video synchronization detection device according to claim 1, wherein the display panel is disposed in the audio-video synchronization detection device, the object under test comprises an audio-video processing unit, and the audio-video processing unit converts an image data stream into the image signal and converts an audio data stream into the audio signal.

3. The audio-video synchronization detection device according to claim 1, wherein the display panel is disposed in the object under test, the object under test further comprises an audio-video processing unit, and the audio-video processing unit converts an image data stream into the image signal and converts an audio data stream into the audio signal.

4. The audio-video synchronization detection device according to claim 1 further comprising:
   a display unit, displaying the delay time.

5. The audio-video synchronization detection device according to claim 1 further comprising:
   an indicating light, wherein the signal processor turns on or off the indicating light according to the synchronization state between the image signal and the audio signal.

6. An audio-video synchronization detection method, for detecting an object under test, wherein the object under test generates an image signal and an audio signal, the audio-video synchronization detection method comprising:
   connecting to the object under test, and receiving the image signal and the audio signal;
   delaying the audio signal for a predetermined time, and generating an audio correction signal accordingly, wherein the predetermined time is used to simulate a delay error in a process of transmitting the audio signal to human ears;
   sensing a light emitted by a display panel when the display panel displays the image signal through an optical sensor, so as to obtain an image sensing signal;
   calculating a delay time between the audio correction signal and the image sensing signal to obtain a synchronization state between the image signal and the audio signal; and
   determining whether the synchronization state between the image signal and the audio signal conforms to a predetermined standard according to the delay time,
   wherein the step of determining whether the synchronization state between the image signal and the audio signal conforms to the predetermined standard according to the delay time comprises:
      determining whether the delay time is longer than a predetermined time;
      when the delay time is longer than the predetermined time, determining that the synchronization state does not conform to the predetermined standard; and
      when the delay time is not longer than the predetermined time, determining that the synchronization state conforms to the predetermined standard.

7. The audio-video synchronization detection method according to claim 6, wherein the display panel is disposed in the object under test.

8. The audio-video synchronization detection method according to claim 6 further comprising:
   displaying the delay time through a display unit.

9. The audio-video synchronization detection method according to claim 6 further comprising:
   turning on or off an indicating light according to the synchronization state between the image signal and the audio signal.

10. The audio-video synchronization detection method according to claim 9, wherein the step of turning on or off the indicating light according to the synchronization state between the image signal and the audio signal comprises:
   when the synchronization state does not conform to a predetermined standard, turning on the indicating light; and
   when the synchronization state conforms to the predetermined standard, turning off the indicating light.

\* \* \* \* \*